United States Patent
Wilson et al.

(10) Patent No.: US 6,795,907 B2
(45) Date of Patent: Sep. 21, 2004

(54) RELOCATION TABLE FOR USE IN MEMORY MANAGEMENT

(75) Inventors: Kenneth Mark Wilson, San Jose, CA (US); Robert B. Aglietti, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 09/896,157

(22) Filed: Jun. 28, 2001

(65) Prior Publication Data

US 2003/0005249 A1 Jan. 2, 2003

(51) Int. Cl.[7] .............................................. G06F 12/10
(52) U.S. Cl. ...................... 711/206; 711/209; 711/221
(58) Field of Search ................................ 711/202, 203, 711/205, 206, 207, 209, 221, 222

(56) References Cited

U.S. PATENT DOCUMENTS

| | | | |
|---|---|---|---|
| 5,297,265 A | * | 3/1994 | Frank et al. ................. 711/202 |
| 6,088,758 A | | 7/2000 | Kaufman et al. ........... 711/100 |
| RE37,305 E | * | 7/2001 | Chang et al. ................ 711/207 |
| 6,314,501 B1 | | 11/2001 | Gulick et al. ............... 711/153 |

* cited by examiner

Primary Examiner—Gary Portka
(74) Attorney, Agent, or Firm—Tuan V. Ngo

(57) ABSTRACT

The present invention, in various embodiments, provides techniques for managing memory in computer systems. In one embodiment, each memory page is divided into relocation blocks located at various physical locations, and a relocation table is created with entries used to locate these blocks. To access memory for a particular piece of data, a program first uses a virtual address of the data, which, through a translation look-aside buffer, is translated into a physical address within the computer system. Using the relocation table, the physical address is then translated to a relocation address that identifies the relocation block containing the requested data. From the identified relocation block, the data is returned to the program.

24 Claims, 7 Drawing Sheets

RELOCATION TABLE FOR USE IN MEMORY MANAGEMENT

FIELD OF THE INVENTION

The present invention relates generally to computer memory management and, more specifically, to a relocation table and corresponding relocation blocks for use in such management.

BACKGROUND OF THE INVENTION

Virtual memory, which is an imaginary memory area supported by the operating system of a computer, increases the set of addresses a program can use. Usually, this set of addresses is referred to as the address space and is divided into units or pages. While virtual addresses are used to access virtual memory, physical addresses are used to locate data stored in physical locations or physical memory corresponding to the virtual addresses. Contemporary computers commonly use translation look-aside buffers or tables to cache virtual to physical page address translations. As program applications grow in size and their data requirements increase, the number of pages required by the applications and hence the number of translations that need to be cached in the translation look-aside buffer increases. Unfortunately, the translation look-aside buffer is often the cycle-time limiter in processors and increasing its size exacerbates the problem.

To limit the number of entries needed in a translation look-aside buffer and thereby reducing its cycle time, designers usually increase the size of memory pages, which decreases the number of entries the translation look-aside buffer needs to contain. This is because a given amount of memory can be represented by fewer pages. However, this approach also increases the time needed for moving a memory page and the number of page faults, which occur when a memory page is accessed but the page is not in memory. In addition, larger pages in memory, especially those of gigabyte sizes, result in more chance that large fractions of the page are not used by the portion of the applications currently executing. This leads to inefficient use of memory.

Some approaches have balanced the disparate needs of large page sizes, small number of translation look-aside buffer entries, and penalties due to moving or copying large pages. However, in these approaches, translation look-aside buffers are still cycle time limiters. "Super pages" have been investigated to combine multiple smaller pages to create one larger page, which combines several translation look-aside buffer entries into one and allows each individual page creating the super page to be stored in non-contiguous memory locations. Nevertheless, all pages are usually stored in system memory or swap memory, which refers to storage areas for data that is not in system memory. Normally, the operating system, during execution of a program, keeps as much data in the system memory as possible, and leaves the rest of the data somewhere else, e.g., in a hard disc. When the system needs the data, it swaps some of the data in system memory with some of the data in the disc.

Based on the foregoing, it is clearly desirable that mechanisms be provided to solve the above deficiencies and related problems.

SUMMARY OF THE INVENTION

The present invention, in various embodiments, provides techniques for managing memory in computer systems. In one embodiment, each memory page is divided into relocation blocks located at various physical locations, and a relocation table is created with entries used to locate these blocks. To access memory for a particular piece of data, a program first uses a virtual address of the data, which, through a translation look-aside buffer, is translated into a physical address within the computer system. Using the relocation table, the physical address is then translated to a relocation address that identifies the relocation block containing the requested data. From the identified relocation block, the data is returned to the program with the original physical address.

In one aspect, the relocation blocks are much smaller than the pages maintained by the translation look-aside buffer. Moving these blocks, e.g., between memory and disc, from disc to buffers, etc., is therefore more efficient. In accordance with the techniques disclosed herein, a computer system can define a page to be as large as needed, and the bigger the page, the bigger the number of relocation blocks is divided from a page. Consequently, the conflicting effects of increasing or decreasing the page sizes in various current approaches are removed. Because the page is divided into smaller blocks, the problem of finding enough contiguous free memory to hold a large memory page is also eliminated. Additionally, each relocation block can be located at various locations, e.g., some blocks are in physical memory, some are in hard disc, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention, in various embodiments, provides techniques for managing memory in computer systems. In one embodiment, each memory page is divided into relocation blocks located at various physical locations, and a relocation table is created with entries used to locate these blocks. In the following description, for the purposes of explanation, numerous specific details are set forth in order to provide a thorough understanding of the invention. However, it will be apparent to one skilled in the art that the invention may be practiced without these specific details. In other instances, well-known structures and devices are shown in block diagram form in order to avoid obscuring the invention.

Hardware Overview

Figure 1:
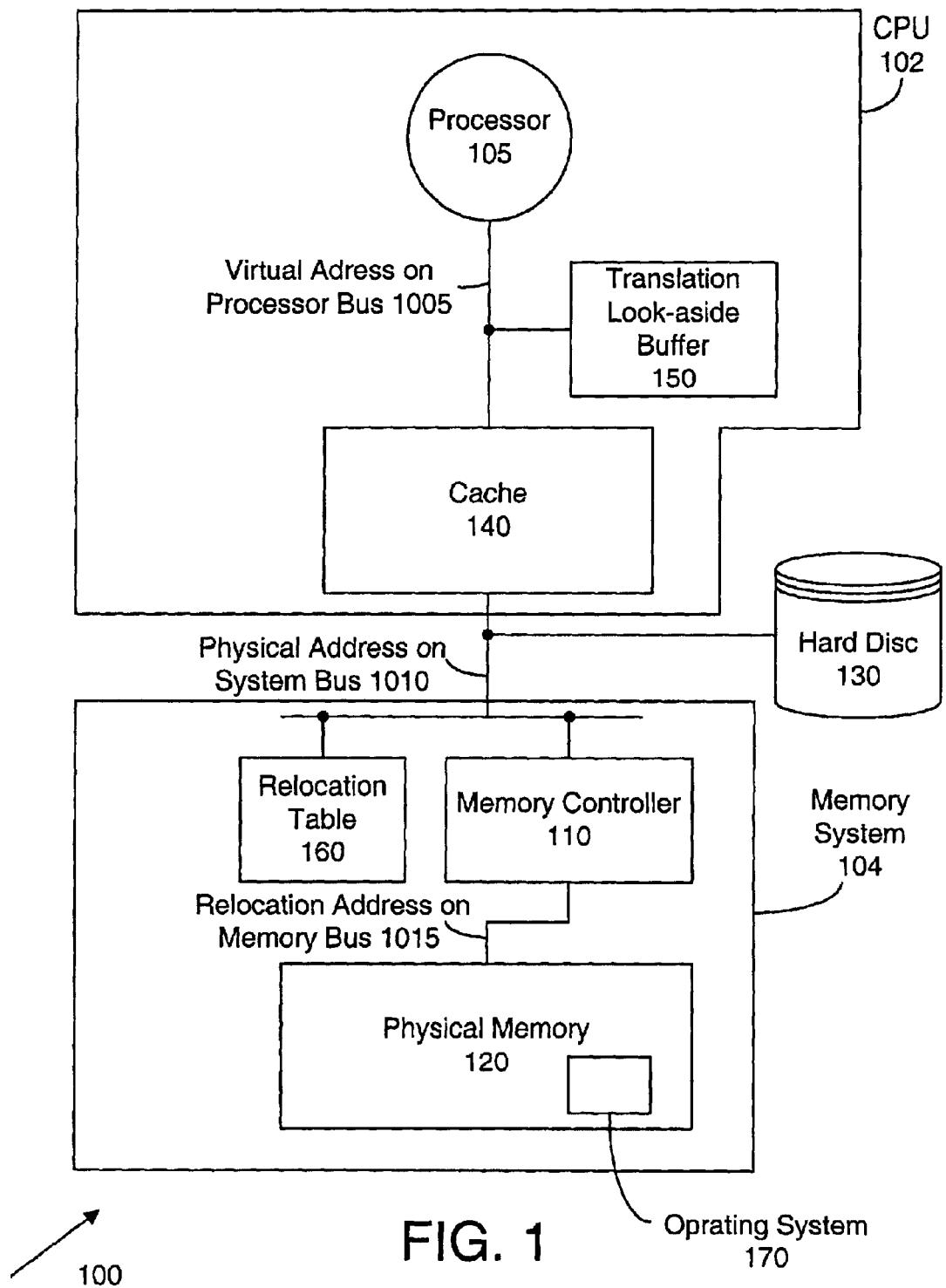
FIG. 1 shows a processor system upon which embodiments of the invention may be implemented.

FIG. 1 shows a uni-processor system 100 upon which embodiments of the invention may be implemented. System 100 includes, in relevant part, a central processing unit (CPU) 102, a memory system 104, and a hard disc 130. CPU 102 in turns includes a processor 105, cache memory 140, and a translation look-aside buffer 150, while memory system 104 includes a memory controller 110, physical memory 120, and a relocation table 160. Memory system 104 is commonly referred to as main memory from which program instructions are executed and program data are manipulated. System 100 normally runs by an operating system 170 resided in physical memory 120. Processor 105, memory controller 110, physical memory 120, hard disc 130, cache memory 140, translation look-aside buffer 150, and operating system 170 are common computer components.

In this document, the configuration of system 100 shown in FIG. 1 is used only as an example; any other configuration of a processing system can be effectively used by the techniques disclosed herein. For example, either one or both of cache 140 and look-aside buffer 150 can be part of processor 105, cache 140 may be outside of CPU 102 or part of memory system 104, there may be more than one processor 105 in CPU 102, etc. In one embodiment, processor 105, upon an access to memory system 104 for some data, uses the data's virtual address on processor bus 1005, which is translated by translation look-aside buffer 150 to a physical address on system bus 1010. This physical address is in turns translated to a relocation address on memory bus 1015. In various approaches, physical addresses on system bus 1010 are used to locate data stored in physical locations or physical memory corresponding to the virtual addresses on processor bus 1005. However, in accordance with the techniques disclosed herein, to identify relocations blocks containing the requested data, relocation table 160, in one embodiment, converts the physical addresses on system bus 1010 to relocation addresses on memory bus 1015. Further, the requested data in the identified relocation block is then returned to processor 105 or the program accessing the data with the original physical address on system bus 1010.

The Relocation Table

Relocation table 160 includes entries used to locate relocation blocks divided from memory pages. In one embodiment, relocation table 160 is part of memory controller 110. However, relocation table 160 can be at any convenient locations such as in a memory unit, physical memory, main memory, cache, part of the processor, etc. In one embodiment, operating system 170, through various program routines, updates relocation table 160, and these routines are separate from other memory management routines of operating system 170 currently found in other approaches. During a standard access to memory system 104, operating system 170, CPU 102, and the routines managing translation look-aside buffer 150 do not need to know that relocation table 160 exists. This is because memory system 104, receiving the physical address on system bus 1010, returns the accessed data with the same physical address. In some special situations, such as when a page fault occurs, the routines managing relocation table 160 may be invoked as part of the process for dealing with such page faults. In one embodiment, relocation table 160 is implemented in hardware such as in random access memory (RAM) or memory controller 110, which normally can be run at high speed and thus does not add significant delay to a memory access. Alternatively, relocation table 160 can be implemented in software.

Figure 2A:
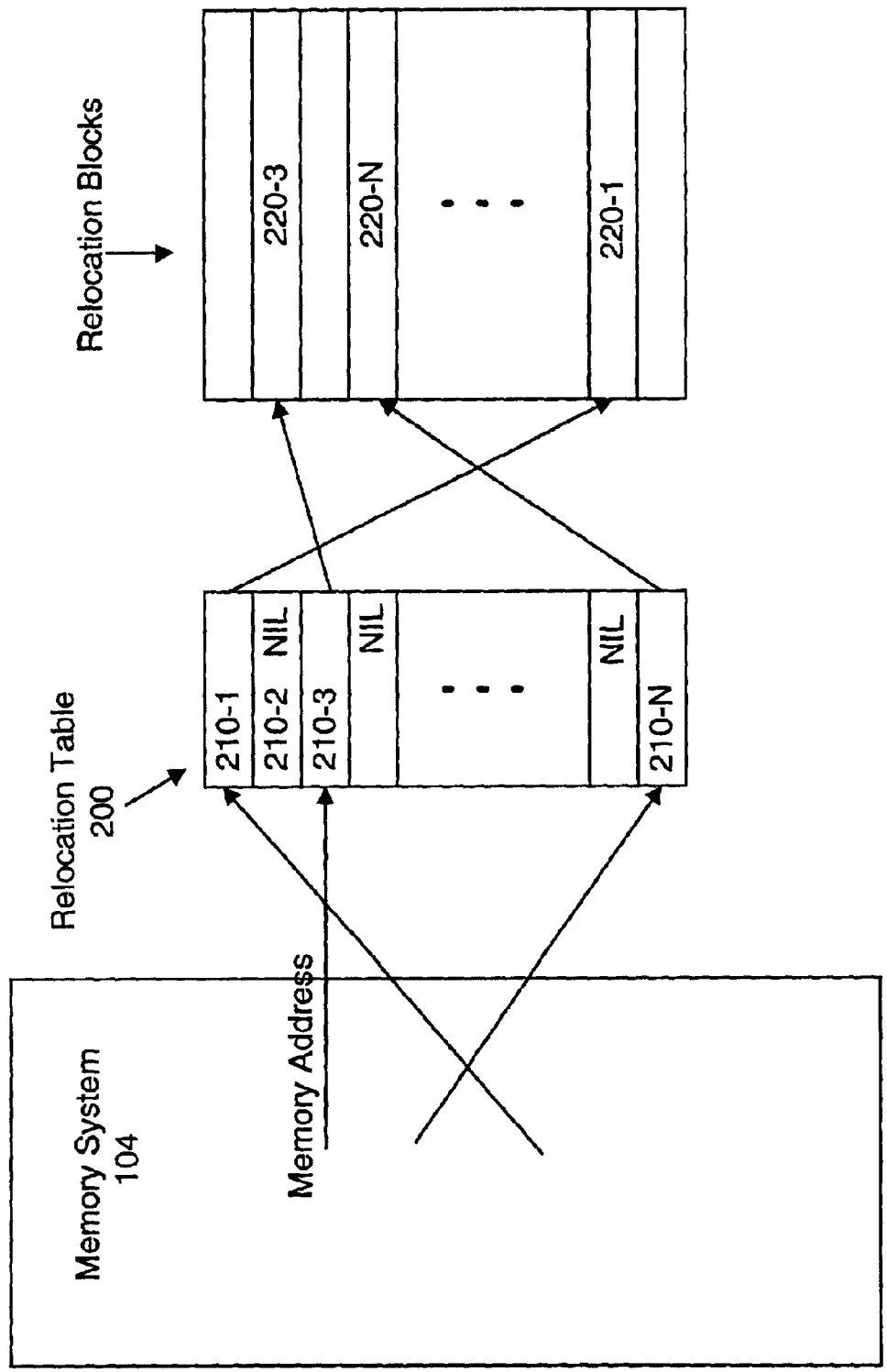
FIG. 2A shows a first embodiment of the relocation table in FIG. 1.

FIG. 2A shows a relocation table 200 being in use with memory system 104 as one embodiment of relocation table 160. Table 200 includes a plurality of table entries, e.g., 210-1 to 210-N for N entries. In one embodiment, if there is no reference to a relocation block 220, an entry 210 is "NIL." However, if a relocation block 220 has been allocated in memory system 104, a corresponding entry 210 points to that relocation block 220 and holds the upper bits of the physical addresses on system bus 1010. In this FIG. 2A example, entries 210-1, 210-2, and 210-3 point to relocation blocks 220-1, 220-2, and 220-3, respectively. These relocation blocks are located at various random locations.

Figure 2B:
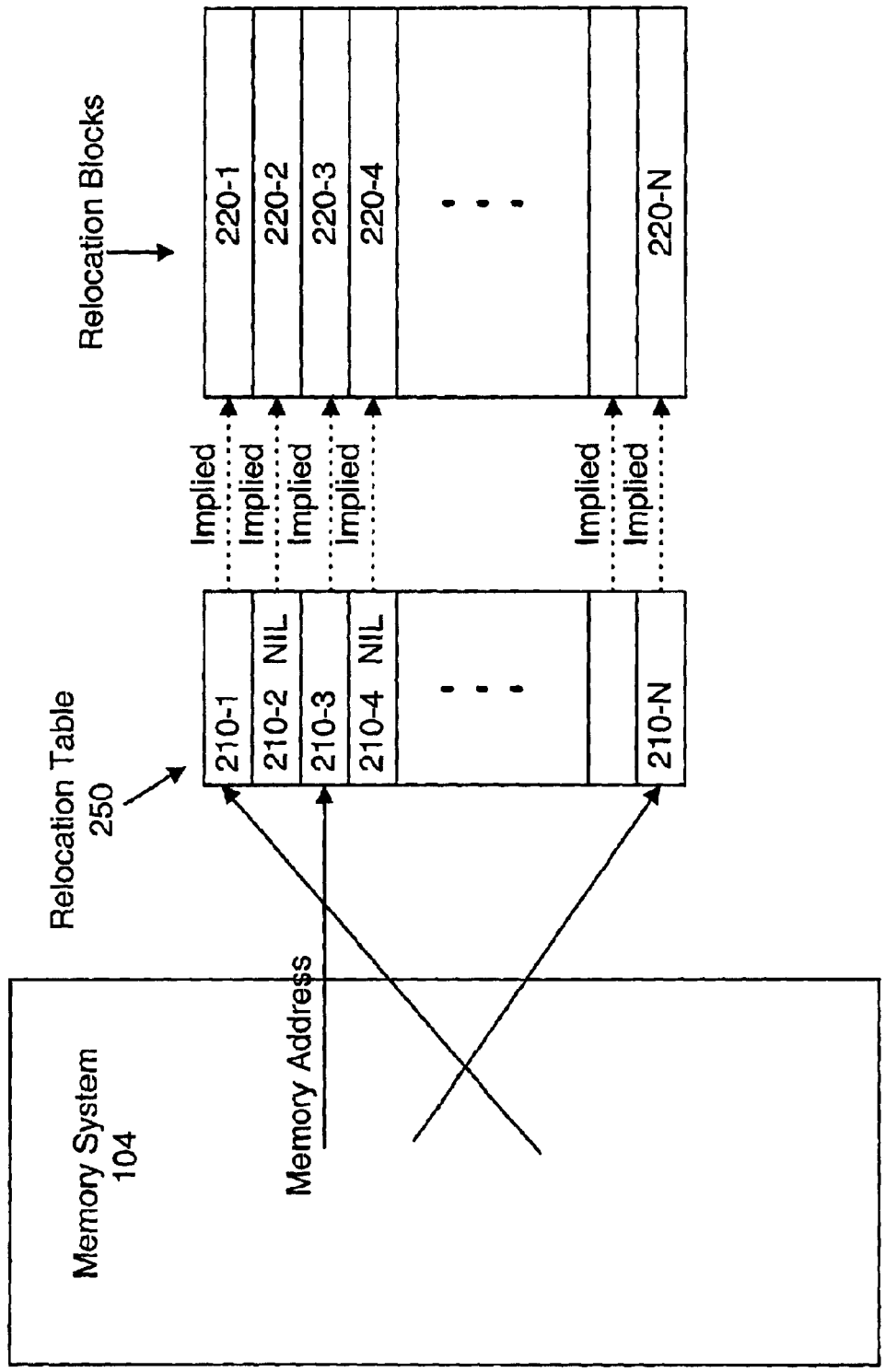
FIG. 2B shows a second embodiment of the relocation table in FIG. 1.

FIG. 2B shows a relocation table 250 as a second embodiment of table 160. In this embodiment, a particular entry 210 corresponds to a particular relocation block 220. For example, a first entry, e.g., 210-1, corresponds to a first relocation block 220-1 in a block of memory, a second entry 210-2 corresponds to a second relocation block 220-2, a third entry 210-3 corresponds to a third relocation block 220-3, etc. Consequently, no pointer is needed to reference relocation blocks 220. Dotted pointers shown in this FIG. 2B illustrate that these pointers are implied, but no actual pointer exists.

Entries of Relocation Table

In one embodiment, an entry 210 includes address bits corresponding to the upper bits of the address maintained by translation look-aside buffer 150 for a memory access. When an address is used to access memory, the lower bits of the address correspond to the requested data's offset within a relocation block 220, and the upper bits are used to index into relocation table 160.

In one embodiment, a fully-associative mechanism is used to perform a translation lookup in relocation table 160. For example, the upper bits of an address presented to memory system 104 are compared to the address in each entry of relocation table 160. In an alternative embodiment, a hash table is used to perform translation lookups. Further, the number of entries in relocation table 160 depends on a hash table and whether the algorithm used in the hash table can help locate the desired data. For example, if a hash table is used, and a good algorithm is not found, then the number of entries 210 in relocation table 160 can be increased to increase the effectiveness of the hash function. In accordance with techniques of the invention, the fully-associative method and hash functions are used as examples only, any other effective method for translation lookups can be used.

Translating from Virtual Address to Relocation Address

Figure 3:
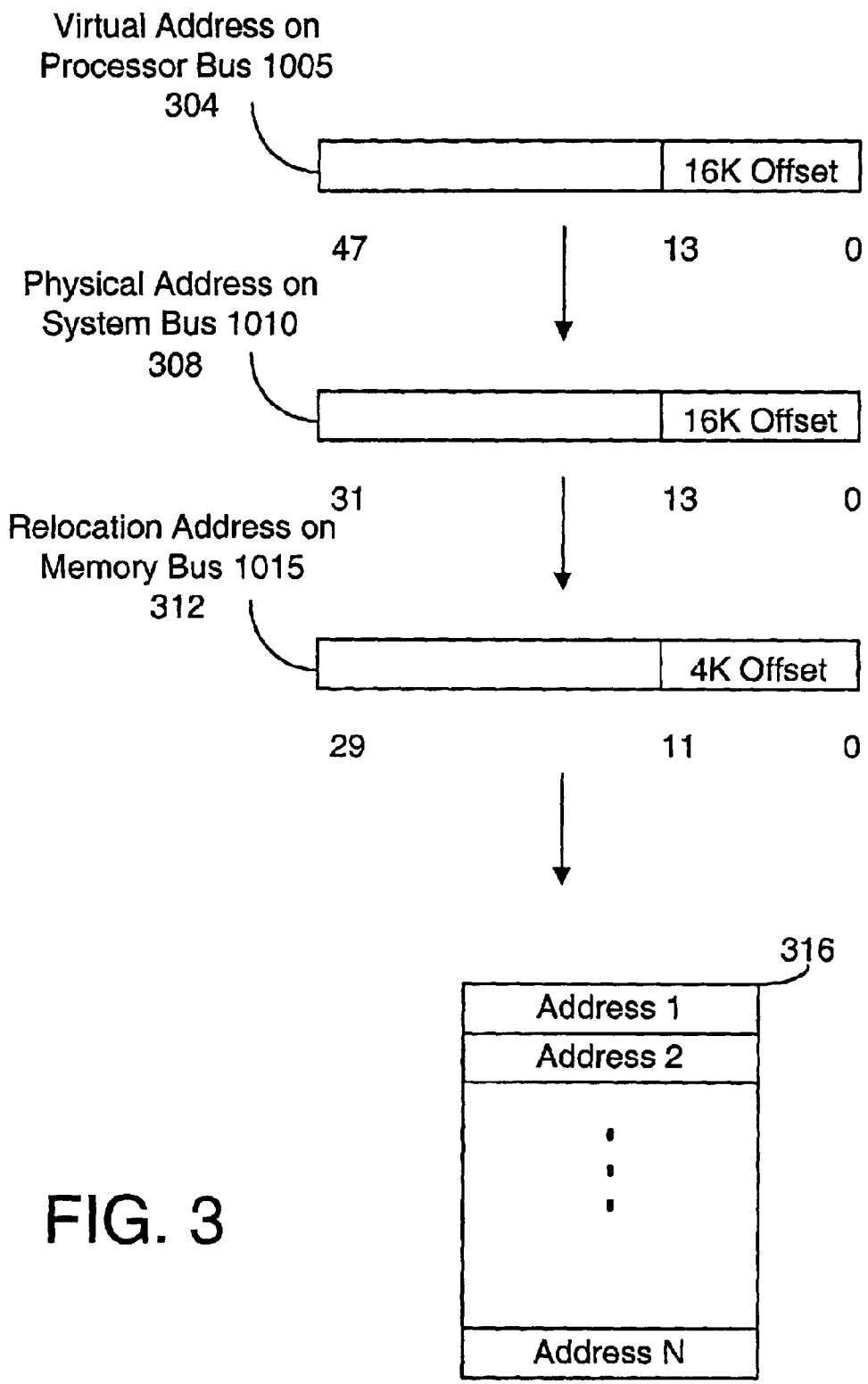
FIG. 3 is used for illustration of converting a virtual address to a relocation address.

Referring to FIG. 3 for an illustration of converting a virtual address on processor bus 1005 in FIG. 1 to a physical address on system bus 1010, and then to a relocation address on memory bus 1015, upon a memory access. In this example, a page is 16K, and is divided into four relocation blocks, each of which is 4K. The virtual address is 48 bits.

Box 304 shows the 48-bit virtual address represented by bits 0–47 in which bits 0–13 represent an offset. With a 14-bit (bits 0–13) offset, all 16K (214) bytes can be addressed within a page. Thirty four bits 14–47 represent the virtual page numbers covering all 234 pages in the virtual address space.

Box 308 shows a 32-bit physical address, represented by bits 0–31. Bits 0–13 also serve as an offset. Bits 14–31 are translated from bits 14–47 in box 304, using translation look-aside buffer 150.

Box 312 shows a 30-bit relocation address used for finding relocation blocks, which are represented by bits 0–29 and are typically located in physical memory 120. Bits 0–11 represent the offset. With this 12-bit offset, all 4K (2*12) bytes can be addressed within a relocation block. Bits 12–29 are translated from bits 14–31 in box 308 by relocation table 160 to locate a relocation block in physical memory 120.

Box 316 shows the addresses translated from bits 12–29 in box 312. Each address corresponds to an entry in relocation table 160, and identifies a relocation block pointed to by the entry.

Creation of the Relocation Table and Relocation Blocks

In one embodiment, relocation table 160 implemented in hardware is created when the computer system is designed. In this embodiment, a certain amount of hardware space is allocated for table 160 and for entries 210. In an alternative embodiment, table 160 implemented in software is created and initialized during system boot-up. Table 160 can be created having a fixed size or a variable size in which some space is first allocated and additional space is appended as necessary. When table 160 is initially created, all entries 210 are "NIL," indicating that entries 210 do not point to any relocation block.

In one embodiment, when operating system 170 allocates memory pages, relocations blocks 220 corresponding to those pages are created. Operating system 170 first allocates a virtual memory page corresponding to a physical address range. The physical address range is then translated into relocation address blocks for each relocation block 220 contained within the physical page. For each relocation block 220, a corresponding table entry 210 is updated with information to locate the relocation block. In one embodiment, relocation blocks 220 are of the same size, but they can be of different sizes. Further, relocation blocks 220 corresponding to a page are concurrently in physical memory. Alternatively, some of the blocks may be in physical memory, some other blocks may be in hard disc or other convenient locations including swap memory. In one embodiment, even though the pages have been divided into relocation blocks, the computer system still considers the relocation blocks divided from a page as a page.

Method Steps in Accordance with One Embodiment

Figure 4:
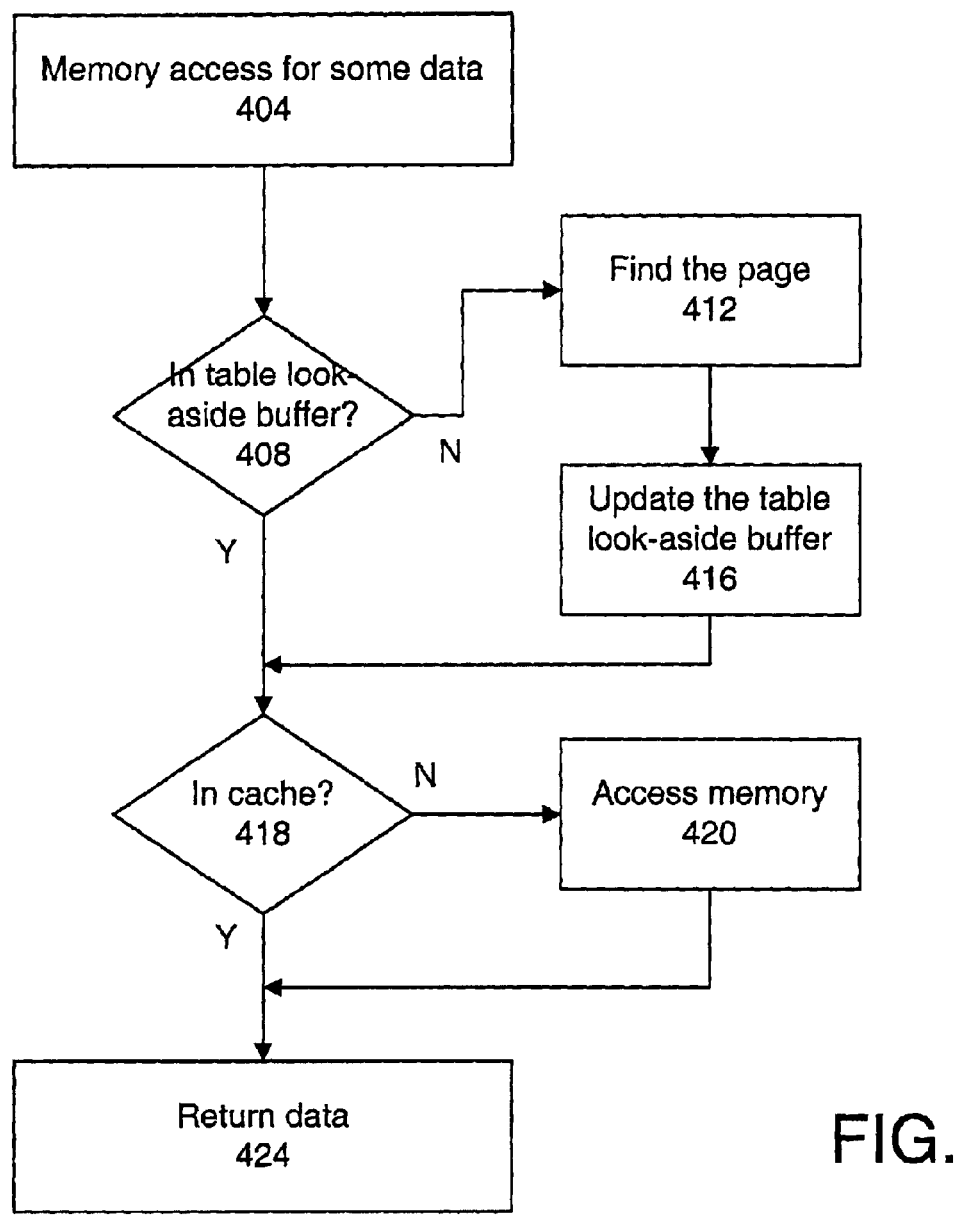
FIG. 4 is a flowchart illustrating a method for a memory access.

FIG. 4 is a flowchart illustrating a method for a memory access in accordance with one embodiment. In step 404, a program is performing a memory access for some data. In one embodiment, the program uses a virtual address of the data for this memory access. Those skilled in the art will recognize that a memory access includes finding a memory page having the address to be accessed.

In step 408, it is determined whether the accessed page is in translation look-aside buffer 150. If the page is not in translation look-aside buffer 150, then in step 412 operating system 170 finds the page, and in step 416 translation look-aside buffer 150 is updated to reflect that the page is in translation look-aside buffer 150.

In step 418, it is determined whether the requested data is in cache 140. If the data is in cache 140, then the data is returned to the program in step 424. However, if the data is not in cache 140, then a memory access is performed in step 420, and after a successful memory access the data is returned in step 424. In one embodiment, the data is returned to the program with the original physical address.

In the above illustration, determining whether the page is in translation look-aside buffer 150 and in cache 140 can be done in parallel.

Figure 5:
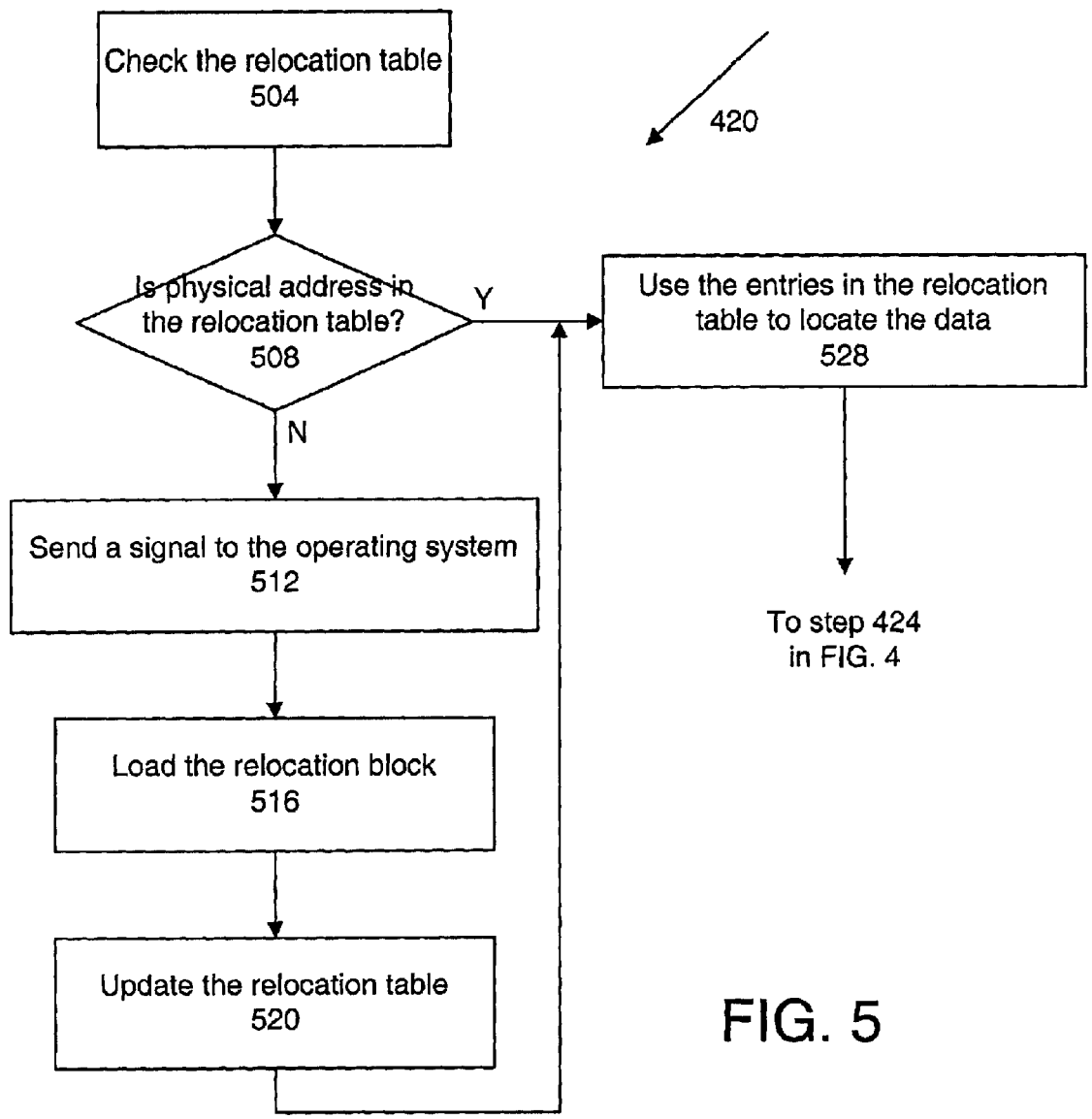
FIG. 5 is a flowchart detailing step 420 in FIG. 4.

FIG. 5 is a flowchart illustrating the steps in performing step 420 in FIG. 4. In step 504, relocation table 160 is checked. In step 508, it is determined whether the address of the data to be accessed is in relocation table 160. If the address is in relocation table 160, then, using the entries in relocation table 160, the data is located in step 528.

However, if the address is not in relocation table 160, which indicates that the relocation block covering the address, in one embodiment, is not in physical memory, then, in step 512, a signal is sent to operating system 170. In step 516, operating system 170, through appropriate program routines, loads the relocation block corresponding to the address to physical memory. Operating system 170 updates relocation table 160 in step 520 to reflect that the page can now be located using an entry in relocation table 160.

Benefit of the Invention

In one aspect, relocation blocks 220 are much smaller than the page sizes maintained by translation look-aside buffer 150. It is therefore more efficient to move these blocks, e.g., between memory and disc, from disc to buffers, etc. A computer system can define a page to be as large as needed, and the bigger the page, the bigger the number of relocation blocks is divided from the page. Consequently, the conflicting effects of increasing or decreasing the page sizes in various current approaches are removed. Because the page is divided into smaller blocks, the problem of finding enough contiguous free memory to hold a large memory page is also eliminated. Additionally, each relocation block 220 can be located at various locations, e.g., some blocks are in physical memory, some are in hard disc, swap memory, etc. Techniques of the invention are advantageously applicable in case of larger sizes, e.g., gigabytes.

Computer System Overview

Figure 6:
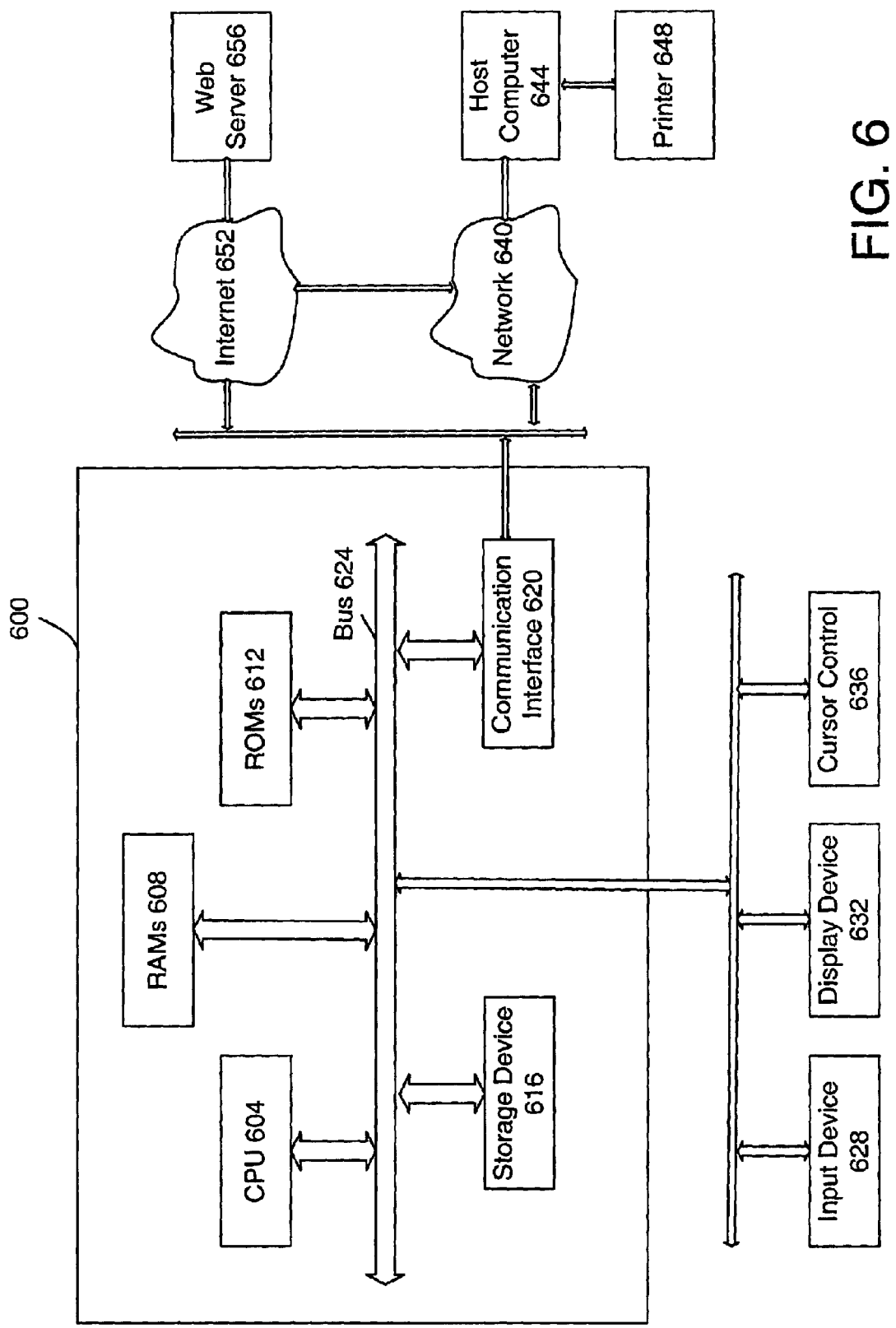
FIG. 6 shows a computer system upon which embodiments of the invention may be implemented.

FIG. 6 is a block diagram showing a computer system 600 upon which embodiments of the invention may be implemented. In one embodiment, computer system 600 includes a central processing unit (CPU) 604, random access memories (RAMs) 608, read-only memories (ROMs) 612, a storage device 616, and a communication interface 620, all of which are connected to a bus 624.

Processor 604 controls logic, processes information, and coordinates activities within computer system 600. In one embodiment, processor 604 executes instructions stored in RAMs 608 and ROMs 612, by, for example, coordinating the movement of data from input device 628 to display device 632.

RAMs 608, usually being referred to as main memory, temporarily store information and instructions to be executed by processor 604. Information in RAMs 608 may be obtained from input device 628 or generated by processor 604 as part of the algorithmic processes required by the instructions that are executed by processor 604.

ROMs 612 store information and instructions that, once written in a ROM chip, are read-only and are not modified or removed. In one embodiment, ROMs 612 store commands for configurations and initial operations of computer system 600.

Storage device 616, such as floppy disks, disk drives, or tape drives, durably stores information for used by computer system 600.

Communication interface 620 enables computer system 600 to interface with other computers or devices. Communication interface 620 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 620 may also allow wireless communications.

Bus 624 can be any communication mechanism for communicating information for use by computer system 600. In the example of FIG. 6, bus 624 is a media for transferring data between processor 604, RAMs 608, ROMs 612, storage device 616, communication interface 620, etc.

Computer system 600 is typically coupled to an input device 628, a display device 632, and a cursor control 636.

Input device 628, such as a keyboard including alphanumeric and other keys, communicates information and commands to processor 604. Display device 632, such as a cathode ray tube (CRT), displays information to users of computer system 600. Cursor control 636, such as a mouse, a trackball, or cursor direction keys, communicates direction information and commands to processor 604 and controls cursor movement on display device 632.

Computer system 600 may communicate with other computers or devices through one or more networks. For example, computer system 600, using communication interface 620, communicates through a network 640 to another computer 644 connected to a printer 648, or through the world wide web 652 to a server 656. The world wide web 652 is commonly referred to as the "Internet." Alternatively, computer system 600 may access the Internet 652 via network 640.

Computer system 600 may be used to implement the techniques described above. In various embodiments, processor 604 performs the steps of the techniques by executing instructions brought to RAMs 608. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 604 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punchcards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 604 are in the form of one or more software programs and are initially stored in a CD-ROM being interfaced with computer system 600 via bus 624. Computer system 600 loads these instructions in RAMs 608, executes some instructions, and sends some instructions via communication interface 620, a modem, and a telephone line to a network, e.g. network 640, the Internet 652, etc. A remote computer, receiving data through a network cable, executes the received instructions and sends the data to computer system 600 to be stored in storage device 616.

Computer system 600 may be implemented to include system 100. For example, CPU 604 may be implemented as CPU 102, RAM 608 as memory system 104, storage device 616 as hard disc 130, etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for managing memory in a computer system, comprising:

for at least one memory page,
dividing the page into a plurality of relocation blocks, each being identified by an entry of a relocation table; and
placing the plurality of relocation blocks at a plurality of locations including one or a plurality of memory systems;

wherein, upon a memory access,
using the relocation table to convert an address of the memory page to a relocation address of a relocation block containing first data intended for the memory access; and
if the first data intended for the memory access is not in physical memory, then loading, in physical memory, one or a plurality of relocation blocks containing second data related to the memory access; the second data including at least the first data; and wherein the address of the memory page was converted from a virtual address of the first data.

2. The method of claim 1 further comprises the step of allocating the plurality of relocation blocks corresponding to the memory page upon receiving the address of the memory page.

3. The method of claim 2 further comprises the step of corresponding each entry of the plurality of entries to a particular location of a relocation block.

4. A system for managing memory in a computer system, comprising:

a plurality of relocation blocks located at a plurality of locations including one or a plurality of memory systems; wherein a set of relocation blocks is divided from a memory page; a relocation block being identified by an entry of a relocation table, and an address of the memory page was converted from a virtual address of data in at least one of the relocation blocks; and a the relocation table is used to convert the address of the memory page to a relocation address of a relocation block containing first data intended for a memory access; and if the first data intended for the memory access is not in physical memory, then loading, in physical memory, one or a plurality of relocation blocks containing second data related to the memory access; the second data including at least the first data.

5. The system of claim 4 further comprises means for allocating the plurality of relocation blocks corresponding to the memory page upon receiving the address of the memory page.

6. The system of claim 5 wherein each entry of the plurality of entries corresponds to a particular location of a relocation block.

7. A computer-readable medium embodying instructions that cause a computer to perform a method for managing memory in a computer system, the method comprising the steps of:

for at least one memory page,
dividing the page into a plurality of relocation blocks each being identified by an entry of a relocation table; and
placing the plurality of relocation blocks at a plurality of locations including one or a plurality of memory systems;

wherein, upon a memory access,
using the relocation table to convert an address of the memory page to a relocation address of a relocation block containing first data intended for the memory access; and
if the first data intended for the memory access is not in physical memory, then, loading, in physical memory, one or a plurality relocation blocks containing second data related to the memory access; the second data including at least the first data;

wherein the address of the memory page was converted from a virtual address of the data.

8. The computer-readable medium of claim 7 wherein the method further comprises the step of allocating the plurality of relocation blocks corresponding to the memory page upon receiving the address of the memory page.

9. The computer-readable medium of claim 8 wherein the method further comprises the step of corresponding each entry of the plurality of entries to a particular location of a relocation block.

10. The method of claim 1 wherein the address of the memory page corresponds to a physical address translated by a translation look-aside buffer.

11. The method of claim 1 wherein an entry of the relocation table includes first address bits corresponding to second address bits maintained by a translation look-aside buffer for use in the memory access.

12. The method of claim 1 wherein if the first data intended for the memory access is not in physical memory, then an address for locating the first data is not in the relocation table.

13. The method of claim 1 wherein the entry corresponding to a relocation block remains pointing to that block when that block moves from one location to another location.

14. The system of claim 4 further comprises a look-aside buffer that maintains address bits for use in the memory access; a first part of the address bits is for use as an offset within a relocation block; a second part of the address bits is for use in indexing into the relocation table.

15. The system of claim 4 wherein if the first data intended for the memory access is not in physical memory, then an address for locating the first data is not in the relocation table.

16. The system of claim 4 wherein the location table is updated after one or the plurality of the relocation blocks is loaded in physical memory.

17. The system of claim 4 wherein the address of the memory page corresponds to a physical address translated by a translation look-aside buffer.

18. A method for managing memory in a computer system, comprising:

dividing a memory page into a plurality of relocation blocks each being identified by an entry of a relocation table;

upon a request for a piece of data converting a virtual address of the piece of data into a physical address;

converting the physical address to an address to identify the piece of data; and if the address identifying the piece of data is in the relocation table, then using an entry of the table to locate the piece of data, else if the address identifying the piece of data is not in the relocation table, then loading, in physical memory, one or a plurality of relocation blocks containing at least the piece of data.

19. The method the piece of data is returned with the physical address in a memory access in response to the request for the piece of data.

20. The method of claim 18 wherein a look-aside buffer maintains address bits for use in a memory access; a first part of the address bits is for use as an offset within a relocation block; a second part of the address bits is for use in indexing into the relocation table.

21. The method of claim 18 wherein a response to the request for the piece of data results in a memory access if the piece of data is not in a cache.

22. The method of claim 18 wherein relocation blocks corresponding to the memory page are created when the memory page is allocated.

23. The method of claim 18 further comprising the steps of allocating a virtual memory page corresponding to a physical address range; translating the physical address range into relocation blocks for each relocation block contained within a physical page, updating an entry corresponding to a relocation block with information to locate that relocation block.

24. The method of claim 18 wherein the entry corresponding to a relocation block remains pointing to that block when that block moves from one location to another location.

* * * * *